United States Patent [19]

Doi et al.

[11] Patent Number: 5,594,067
[45] Date of Patent: Jan. 14, 1997

[54] METHOD OF MANUFACTURING WATER-BASED SILICONE-TYPE GRAFT COPOLYMER EMULSION

[75] Inventors: Yukio Doi, Ibo-gun; Wei-Zhong Zhang; Masayoshi Kinugasa, both of Tatuno, all of Japan

[73] Assignee: Showa Highpolymer Co., Ltd., Tokyo, Japan

[21] Appl. No.: 244,044

[22] PCT Filed: Apr. 20, 1993

[86] PCT No.: PCT/JP93/00512

§ 371 Date: May 23, 1994

§ 102(e) Date: May 23, 1994

[87] PCT Pub. No.: WO94/06838

PCT Pub. Date: Mar. 31, 1994

[30] Foreign Application Priority Data

Sep. 21, 1992 [JP] Japan .................................... 4-278113

[51] Int. Cl.$^6$ ....................................................... C08J 3/24
[52] U.S. Cl. ........................ 524/806; 524/731; 526/279; 525/477; 525/479
[58] Field of Search ............................ 526/279; 524/806, 524/731; 525/477, 479

[56] References Cited

U.S. PATENT DOCUMENTS

| | | | |
|---|---|---|---|
| 4,261,875 | 4/1981 | LeBoeuf | 260/29.7 H |
| 4,962,165 | 10/1990 | Bortnick et al. | 525/479 |
| 4,987,178 | 1/1991 | Shibata et al. | 524/547 |

FOREIGN PATENT DOCUMENTS

| | | |
|---|---|---|
| 377188A2 | 7/1990 | European Pat. Off. . |
| WO90/10665 | 9/1990 | WIPO . |

*Primary Examiner*—Margaret W. Glass
*Attorney, Agent, or Firm*—Oblon, Spivak, McClelland, Maier & Neustadt, P.C.

[57] ABSTRACT

A method of manufacturing a water-based silicone type graft copolymer emulsion in which silicone (a macromonomer) having a radical polymerizable functional group and another vinyl monomer are, under presence of a surface active agent having a radical polymerizable functional group, emulsified and dispersed to a particle size of 0.5 μm or less, and the temperature is raised to copolymerize the emulsified and dispersed material. In the macromonomer, a macromonomer with a silicone structural unit repetition number n of less than 20 is contained in a quantity of 5 to 80 wt %.

4 Claims, No Drawings

METHOD OF MANUFACTURING WATER-BASED SILICONE-TYPE GRAFT COPOLYMER EMULSION

TECHNICAL FIELD

This invention relates to a method of manufacturing a water-based silicone-type graft copolymer emulsion, and more particularly to a water-based emulsion for use in a variety of fields, such as paint resins, agents for processing paper, fiber and film, civil engineering resins, adhesives and tackifiers.

BACKGROUND ART

Hitherto, methods of manufacturing a silicone-type graft copolymer have been categorized into methods in which active groups are formed by drawing hydrogen from lower alkyl groups bonded to silicon atoms of the silicone and then organic polymers are grafted to the active groups, and a method in which silicone having the active groups is previously manufactured and then the organic polymers are grafted to the active groups.

In the former case, hydrogen must be drawn from silicone, and therefore suitable methods and conditions must be employed. For example, the ability for drawing hydrogen, the grafting efficiency and the molecular weight of the organic polymer grafted to the organic peroxide are affected by the type and the quantity of the organic peroxide and the reaction temperature. However, it is difficult to adequately control the foregoing factors.

In the latter case, silicone having active groups and living polymers obtainable from anion polymerization are allowed to react with each other so that the silicone type graft copolymer can be obtained. However, due to excessive complication of the structure using the anion polymerization, unsatisfactory range in selecting the polymerizable monomer for use in the anion polymerization, high manufacturing cost and difficulty involved in the operation the latter method has been unsatisfactory as a commercial manufacturing method.

On the other hand, a method (hereinafter referred to as a "macromonomer method"), in which high-molecular monomers each having polymerizable functional groups, such as double bonds, are copolymerized with other copolymer monomers and which is able to manufacture the graft polymers, has attracted attention. In this case, the foregoing method has generally been performed by means of solution polymerization in which both high-molecular monomers and monomers to be copolymerized with the high-molecular monomers are dissolved in an organic solvent and they are polymerized or by means of suspension polymerization caused to proceed in a water-based solvent. However, the solution-type graft polymer cannot satisfy the needs of the times to prevent pollution and save resources, while the graft polymer obtainable from the suspension polymerization encounters phase separation into a liquid phase and a solid phase, making it difficult to use in liquid form as a water-based dispersion. Therefore, an emulsion type graft polymer, which can be used in place of the foregoing graft polymer and which is composed of emulsified dispersions each having a small particle size, has been earnestly sought. Although there are only a few methods for manufacturing the graft polymer by means of the macromonomer method in which the water-based emulsification polymerization is performed, there are the following proposals.

For example, Japanese Patent Laid-Open No. 3-163103 has suggested a method for manufacturing a graft polymer emulsion comprising the steps of: dissolving high-molecular monomers each having radical polymerizable functional groups and an oil soluble radical polymerization initiator in another vinyl monomer which is copolymerizable with the high-molecular monomer; emulsifying and dispersing, in a water-based medium, the obtained solution under the presence of an emulsifier composed of an alkali metal sulfosuccinate or another sulfonic acid or alkali metallic salt sulfate type anion surface active agent and a nonion surface active agent having an HLB value of 10 or more; and raising the temperature to copolymerize the high-molecular monomers and the other vinyl monomers.

However, the foregoing method requires that the high-molecular monomer and another copolymerizable monomer, which is copolymerized with the high-molecular monomer, have some compatibility. Therefore, high-molecular monomers, such as silicone high-molecular monomers, that have excessively poor compatibility with the other copolymerizable monomer to be copolymerized, are omitted from the scope of the foregoing invention. If the substances to be copolymerized with each other are not compatible, a problem rises in that aggregated blocks (called grids) are formed in great quantities during the polymerization. There also arises another problem in that the purity is low because large quantities of polymers that have not been grafted are contained therein.

On the other hand, Japanese Patent Laid-Open No. 1-284513 discloses an acryl-type emulsion composition manufactured by a usual emulsification polymerizing method using low molecular weight silicone type high-molecular monomers, the number n of repetitions of structural units of which is 20 or less, the obtained composition being free from grids and having greater vapor penetration resistance and waterproofness than the conventional acrylic emulsion. However, the repellency and the separation characteristics and the like that are the inherent characteristics of the silicone type polymers cannot be obtained. What is worse, a problem of unsatisfactory stability has obstructed the practical use of the foregoing composition.

It has not always easy to have a silicone type high-molecular monomer, which has no compatibility with the other copolymerizable monomer used, react sufficiently and cause all of the characteristics of the silicone polymer based on that reaction to be exhibited. That is, the rate of reaction can be raised by only reducing the molecular weight of the silicone type high-molecular monomer. Furthermore, the molecular weight of the silicone type high-molecular monomer must be raised in order to cause the silicone to exhibit its characteristics. It has been difficult to find a good balance between the foregoing factors. That is, it has been very difficult for the silicone type high-molecular monomer having a high molecular weight to be formed into a highly polymerized copolymer at an excellent rate of reaction.

As described above, another problem arises in that aggregations of polymers (called "grids") are easily formed at the time of the emulsification polymerization in the system using the silicone type high-molecular monomer. Furthermore, the stability of the obtainable water-based copolymer emulsion has been unsatisfactory. As a result, a satisfactory method has not been achieved yet.

The present invention is directed to the manufacture of a water-based copolymer emulsion using a silicone type high-molecular monomer, and an object thereof is to establish a method of manufacturing a water-based silicone type graft copolymer emulsion exhibiting satisfactory stability, and excellent repellency and separating characteristics, in which silicone having radical polymerizable functional groups each having a large molecular weight is used to cause the silicone component to sufficiently exhibit its characteristics while maintaining a high rate of reaction, and preventing the formation of grids which create problems at the time of emulsification polymerizing reactions of high-molecular monomers having large molecular weights.

DISCLOSURE OF INVENTION

According to the present invention, there is provided a method of manufacturing a water-based silicone type graft copolymer emulsion comprising the steps of:

emulsifying and dispersing a silicone having a radical polymerizable functional group (hereinafter referred to as macromonomer) and another vinyl monomer to a particle size of 0.5 μm or less under the presence of a surface active agent having a radical polymerizable functional group, and then raising the temperature to copolymerize the emulsified and dispersed material, characterized in that in the macromonomer, a macromonomer having the silicone structural unit repetition number n of less than 20 is contained in a quantity of 5 to 80 wt %, said macromonomer being expressed by General Formula (I):

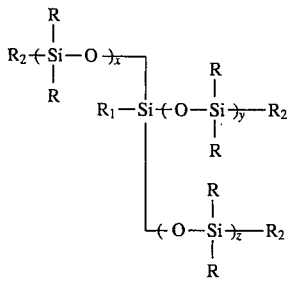

[R; —OH, —OC$_m$H$_{2m+1}$, —OPh, —C$_m$H$_{2m+1}$, —Ph,

—C$_m$H$_{2m}$—CH=CH$_2$, —C$_m$H$_{2m}$—OC—C=CH$_2$,
                                    ‖   |
                                    O   CH$_3$

—C$_m$H$_{2m}$—C=CH$_2$ , —C$_m$H$_{2m}$—C=CH$_2$,
         |                         |
         OC$_m$H$_{2m+1}$            C$_6$H$_5$

—(CH$_2$CH$_2$—O)$_n$—CH=CH$_2$  (n = 1 ~ 10),

—CH$_2$—C$_6$H$_4$—CH=CH$_2$ where Ph is a phenyl group, an alkyl substituted phenyl group and m is 0 to 10, R$_1$; —C$_m$H$_{2m}$—CH=CH$_2$, —C$_m$H$_{2m}$—OC—C=CH$_2$,
                                    ‖   |
                                    O   CH$_3$ —C$_m$H$_{2m}$—C=CH$_2$ , —C$_m$H$_{2m}$—C=CH$_2$,
         |                         |
         OC$_m$H$_{2m+1}$            C$_6$H$_5$ —(CH$_2$CH$_2$—O)$_n$—CH=CH$_2$  (n = 1 ~ 10),

—CH$_2$—C$_6$H$_4$—CH=CH$_2$

R$_2$; —C$_m$H$_{2m+1}$, —OH, —C$_m$H$_{2m}$—CH=CH$_2$,

—C$_m$H$_{2m}$—OC—C=CH$_2$,
         ‖   |
         O   CH$_3$

—C$_m$H$_{2m}$—C=CH$_2$ , —C$_m$H$_{2m}$—C=CH$_2$,
         |                         |
         OC$_m$H$_{2m+1}$            C$_6$H$_5$

—(CH$_2$CH$_2$—O)$_n$—CH=CH$_2$  (n = 1 ~ 10),

—CH$_2$—C$_6$H$_4$—CH=CH$_2$

[where x=0 to 150, y=0 to 150 and z=0 to 150, and n=x+y+z].

Furthermore, there is provided a method of manufacturing a water-based silicone type graft copolymer emulsion according to claim 1 wherein the copolymerization performed under presence of silicone (hereinafter referred to as a "non-macromonomer") expressed by General Formula (II) and having no radical polymerizable functional group:

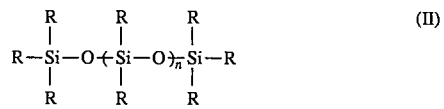

[where R: —C$_m$H$_{2m+1}$, or —Ph (m is 0 to 10) and n is 100 to 10000]. As a result of the development, the foregoing objects were achieved.

The present invention will now be described in detail.

The macromonomer according to the present invention is directed to all substances composed of a radical polymerizable functional group and a silicone polymer. That is, the macromonomer has one and/or several radical polymerizable functional groups in one molecule thereof in which the silicone structural unit repetition number n is less than 20 as well as those in which the silicone structural unit repetition number n is 20 or more.

The non-macromonomer according to the present invention is, in principle, composed of the same repetition units except for the polymerizable functional group from the macromonomer, the non-macromonomer having a silicone structural unit repetition number n of 100 or more with a number of 400 or more being generally preferable. However, some differences are permitted if good compatibility with the macromonomer is attained even though the same structures are not repeated.

In the present invention, the content of the macromonomer in which the silicone structural unit repetition number n is less than 20 is 5 wt % to 80 wt % of the total macromonomer component (the total quantity of macromonomer in which the number n is less than 20 as well that in which the number n is 20 or more).

If the content is less than 5 wt % or larger than 80 wt %, the characteristics of the silicone originating from either the macromonomer or non-macromonomer, in particular such characteristics as repellency and separation characteristics, cannot be sufficiently exhibited.

Although in principle macromonomers in which the silicone structural unit repetition number n is 20 or more, or non-macromonomers in which the silicone structural unit repetition number n is 100 or more may be used together with the macromonomer in which the silicone structural unit repetition number n is less than 20, if the repetition units in the composition portion are the same, some differences are permitted if they have good mutual compatibility.

As the radical polymerizable functional group of the macromonomer, any radical polymerizable functional group may be employed. For example, methacryloyl groups, acryloyl groups, allyl groups, styryl groups, vinyl groups, vinyl ether groups, vinyl benzyl groups, vinyl alkylsilyl groups and vinyl ketone groups may be exemplified.

It is preferable that the number of the reactive functional groups in one molecule of the macromonomer be one or more. If the number of the functional groups is large, grafting efficiency is good even if a high-molecular weight macromonomer, the silicone structural unit repetition number n of which is 20 or more, is used and this causes the silicone to sufficiently exhibit its characteristics. However, as the amount of macromonomer comprising two or more reactive functional groups in one molecule used increases there is an increase in gelling or grid generation during polymerization, and further, the minimum film forming temperature (MFT) of the obtained emulsion is raised excessively. Accordingly, this creates problems film forming ability. The reason for this is that use of a polyfunctional group macromonomer causes molecules to crosslink and although it has been well known that, if crosslinking of the foregoing type has taken place to a degree exceeding a certain limit, the foregoing undesirable phenomenon appears, in order to prevent this, a monofunctional group macromonomer must also be used therewith.

Although it is difficult to unconditionally define the ratio of the monofunctional group macromonomer and the polyfunctional group macromonomer because the ratio is considerably changed due to the total quantity of use of the macromonomer, the polyfunctional macromonomer may be used solely in a quantity of about 20 wt % or less with respect to the total copolymerizable component (the total quantity of the macromonomer component and other vinyl monomer components). It is preferable that the portion exceeding the foregoing ratio be the monofunctional macromonomer.

Among a variety of conceivable methods for manufacturing the macromonomer, one method may be mentioned in which, for example, the polymer having the repeated unit structure is made to have a hydroxyl group, and isocyanate ethyl methacrylate is added thereto and the two are bonded. Another method may be exemplified in which glycidyl methacrylate is added to the carboxylic group in the polymer and the two are bonded.

In addition, a method in which a living polymer is obtained by solution polymerization using an anion polymerization initiator and a compound having a radical polymerizable group is, as a stopper, caused to react to it, and another method in which a radical polymerization chain transfer agent of a type giving the molecule terminal a carboxylic group is used to obtain a polymer, and then the polymer and glycidyl methacrylate are allowed to reach to each other may also be exemplified.

It is preferable that the ratio of blending the macromonomer or the macromonomer and the non-macromonomer and the other copolymerizable vinyl monomer be made in such a manner that the quantity of the macromonomer or the total quantity of the macromonomer and the non-macromonomer be 1 to 60 wt % with respect to the total quantity. If the quantity is less than 1 wt %, desired characteristics cannot easily be realized. If it is higher than 60 wt %, the rate of reaction deteriorates or liberated substance of the macromonomer and grids easily can be formed (the quantity of the other copolymerizable vinyl monomer is 40 to 99 wt %).

The quantity of the non-macromonomer used with respect to the total quantity of the macromonomer and the non-macromonomer is 50 wt % or less. If it is blended in a quantity larger than 50 wt %, a portion of the non-macromonomer results in liberation from the generated system, and a problem arises.

The requirement that both the macromonomer component and the non-macromonomer component be composed of a single type substance can be eliminated. Two or more types may be mixed to satisfy desired characteristics. However, the components employed must have good compatibility.

As the silicone macromonomer, the macromonomer with an n of 20 or more, may be selected from any of those on the market, such as, for example, FM-0715 (n=39), FM-0721 (n=65), FM-0725 (n=131) (manufactured by Chisso Corporation), BX16-192 (n=50) (Toray Dow Corning Silicone), X-22-5004C (n=60), and X-22-174D (n=65) (Shin-Etsu Chemical Co., Ltd.). The macromonomer with an n of less than 20, may be selected from any of those on the market, such as, for example, FM-0705 (n=7) and FM-0711 (n=13) (Chisso Corporation). The non-macromonomer with an n of 400 or more, may be selected from any of those on the market, such as, for example, SH200-60000 (n=780) and SH200-100000 (n=1300) (Toray Dow Corning Silicone). Furthermore, the polyfunctional group macromonomer may be selected from any of those on the market, such as, for example, FM-0711 (n=13), FM-7721 (n=65) (Chisso Corporation), X-22-164A (n=13) and X-22-164C (n=65) (Shin-Etsu Chemical Co., Ltd.).

According to the present invention, the other vinyl monomer for use to be emulsification-copolymerized with the macromonomer is a radical polymerizable monomer. Any material that satisfies the foregoing definition may be employed, as exemplified herein: vinyl esters such as vinyl acetate, vinyl propionate or vinyl versenate; alkyl esters of acrylic acid or methacrylic acid such as methyl acrylate, ethyl acrylate, butyl acrylate, iso-octyl acrylate, methyl methacrylate, ethyl methacrylate or butyl methacrylate; fluorine-containing acrylate such as polyfluoroacrylate or perfluoroalkyl acrylate; silyl-group-containing acrylates or methacrylates such as acryloyl oxypropyl trimethoxysilane or acryloyl oxypropyl triethoxysilane; vinyl aromatic monomers such as styrene or vinyl toluene; vinyl compounds such as acrylonitrile, methacrylonitrile, vinyl chloride or vinylidene chloride; α-olefins such as ethylene, propylene or butene; diens such as butadiene or isoprene; hydroxyl-group-containing monomers such as hydroxyethylacrylate or hydoroxyethylmethacrylate; carboxylic-group-containing monomers such as acrylic acid, methacrylic acid, maleic acid or fumaric acid, acid-group-containing monomers such as vinyl sulfonic acid; and basic monomers such as vinyl pyridine, vinyl imidazole or dimethyl aminoethyl methacrylate or their quaternary compound.

Furthermore, a monomer having two or more radical polymerizable double bonds in one molecule thereof is exemplified, the monomer being exemplified by divinyl benzene, diallyl phthalate, diethylene glycol diacrylate, trimethylol propane triacrylate and tetra allyl oxyethane. However, it is preferable that the foregoing polyfunctional monomer be several wt % or less of the overall quantity of the other vinyl monomer. One or more types of polyfunctional monomers may be used.

As the emulsion stabilizer for the present invention, a cation, anion or nonion emulsion stabilizer may be used regardless of the ionicity. However, a surface active agent having the radical polymerizable functional group must be used. For example, it may be selected from the following agents respectively expressed by:

General Formula (III):

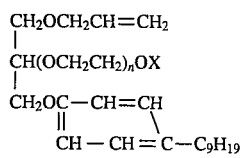

(where X is hydrogen or —SO$_3$NH$_4$ and n is 5 to 50).

General Formula (IV):

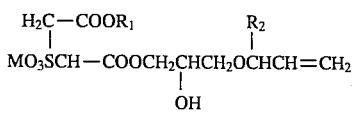

(where R$_1$ is a hydrocarbon radical allowed to have a substituent, R$_2$ is hydrogen or a methyl group and M is Na or NH$_4$).

General Formula (V):

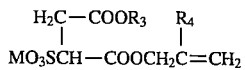

(where R$_3$ is a hydrocarbon radical allowed to have a substituent, R$_4$ is hydrogen or a methyl group and M is Na or NH$_4$).

General Formula (VI):

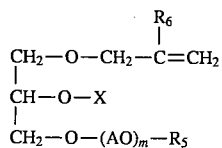

(where R$_5$ is a hydrocarbon radical allowed to have a substituent, R$_6$ is hydrogen or a methyl group, A is an alkylene group having 2 to 4 carbon atoms, X is hydrogen or a nonion type hydrophilic group or an anion type hydrophilic group and m is 0 to 100).

General Formula (VII):

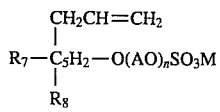

(where R$_7$ is an alkyl group, alkenyl group or an aralkyl group having 4 to 18 carbon atoms, R$_8$ is hydrogen or an alkyl group or an alkenyl group or an aralkyl group having 4 to 18 carbon atoms, A is an alkylene group of a substituted alkylene group having 2 to 4 carbon atoms, n is 2 to 200, M is an alkali metal atom or NH$_4$ or an alkanol amine residual group).

General Formula (VIII):

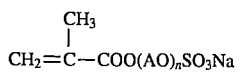

(where A is an alkylene group having 2 to 4 carbon atoms and n is 0 to 100) or

General Formula (IX):

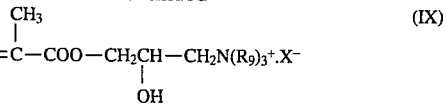

(where R$_9$ is an alkyl group having 1 to 6 carbon atoms and X is a hydrochloride group). Although the quantity of use of the surface active agent having the radical polymerizable functional group varies depending upon the type, the molecular weight and the quantity of use of the macromonomer, it may generally be used by about 0.1 to 10 parts by weight with respect to 100 parts by weight of the total quantity of the resin component.

The foregoing surface active agent having the radical polymerizable functional group and a surface active agent for use in normal emulsification polymerization may, of course, be used together. However, the former agent must be used in a quantity of 50 wt % or more. If the quantity is less than 50 wt %, stable manufacturing of the emulsion, the particle components of which are composed of the macromonomer and the other vinyl monomer or composed of the macromonomer, the non-macromonomer and the other vinyl monomer, to be performed prior to the emulsification polymerization is made difficult. Furthermore, a large quantity of grids are undesirably generated during the emulsification polymerization reactions, and the stability of the obtained emulsion deteriorates excessively.

As the polymerization initiator for use in the copolymerization reaction system, any ordinary radical polymerization initiator of an oil soluble type, initiator may be employed, for example, an azo-type substance such as 2,2'-azobis isobutylonitrile, 2,2'-azobis-2,4-dimethylvaleronitrile, 1-azobis-1-cyclohexanecarbonitrite, dimethyl-2,2'-azobisisobutylate or 4,4'-azobis-4-cyanovaleic acid; and an organic peroxide such as lauroylperoxide, benzoylperoxide, dicumylperoxide, cyclohexanone peroxide, di-n-propyl peroxydicarbonate or t-butyl peroxydipivalate. Moreover, a water soluble type initiator, such as ammonium persulfate, potassium persulfate, sodium persulfate, peroxide or dibenzoyl peroxide may be used. However, it is preferable to use the oil soluble polymerization initiator, if anything.

The method of addition may be a method in which it is directly added to a mixture of the other polymerizable vinyl monomer and the macromonomer or a mixture of the foregoing substances and the non-macromonomer. If the water soluble substance is employed, it may individually be added to the aqueous phase. It is preferable that the quantity of use be 0.01 to 5 parts by weight with respect to 100 parts by weight of the total quantity of the macromonomer, the non-macromonomer and the other vinyl monomer.

The emulsification copolymerization to be performed in the present invention is carried out by using a specific raw material. The method can easily be selected by one skilled in the art. For example, the macromonomer or the macromonomer and the non-macromonomer are dissolved in the other copolymerizable vinyl monomer, the oil soluble polymerization initiator is added, this is added into a water solution of the surface active agent having the radical polymerizable functional group, which is then emulsified to make an emulsion having a particle size of 0.5 μm or less. A portion of the emulsion is then injected into a flask, the temperature is raised to about 80° C. to cause the polymerization reactions to proceed, the residual emulsion is dripped, the reaction temperature is maintained even after dripping has been completed to mixture the reactants, and the reactants are cooled so that a desired reaction product is obtained. A method, in which the foregoing emulsions are collectively injected to be polymerized, may also, of course, be adapted.

The emulsifying method may be performed by using a normal emulsifying apparatus, such as a high speed stirrer having a rotor and a stator disposed at a short interval, an ultrasonic emulsifier or a high-pressure emulsifier which jets out the material at a high pressure toward a narrow gap. The particle size of the emulsion must be 0.5 μm or less, preferably 0.3 μm or less. If the particle size is larger than 0.5 μm, grids are formed excessively during the process of the reactions, the rate of reaction of the macromonomer is too low and both the emulsion before and after the reactions have been completed are unstable.

The polymerization reactions may usually be performed at about 50° to 90° C., preferably about 60° to 85° C., while the time in which the reactions are performed may be about 2 to 8 hours.

It is preferable that the resin component of the silicone type graft copolymer emulsion according to the present invention be 20 to 60 wt % as the nonvolatile component.

In order to reduce the residual monomer during the maturing process, it is preferable that a small quantity of a polymerization initiator be added afterwards. It is preferable that the polymerization initiator to be added afterwards be different from the initiator for use in the reactions.

The present invention is directed to overcome the instability of the conventional water-based silicone type graft copolymer emulsion which encounters the phase separation causing a difficulty in treating it in the form of a liquid substance, the present invention being able to overcome the foregoing problems when the mixture of the macromonomer expressed by General Formula (I) and the other vinyl monomer or the mixture of the foregoing substances and the non-macromonomer is emulsified and dispersed to a particle size of 0.5 μm or less to be copolymerized under the presence of the surface active agent having the radical polymerizable functional group so as to manufacture the silicone type graft copolymer emulsion. Furthermore, the macromonomer having a large molecular weight can be copolymerized at an excellent rate of reaction. Thus, a copolymer emulsion capable of exhibiting its silicone characteristics was obtained. Although the reason for this has not been clarified yet, it is conceivable that the following operation mechanism achieves the foregoing results.

That is, although the macromonomer with a silicone structural unit repetition number n that is less than 20, can easily be copolymerized with the other vinyl monomer so that the graft polymer is formed, the graft chains are too short to obtain the characteristics expected from the graft polymer component. Since the silicone type macromonomer having a large molecular weight such that the silicone structural unit repetition number n is 20 or more and possessing characteristics expected from the composition component suffers from poor reactivity, the grafting efficiency is unsatisfactorily low. Therefore, it easily forms a graft polymer having a low degree of polymerization, resulting in that a substance having the desired silicone polymer characteristics cannot be obtained.

It has been well known that a chain having a large molecular weight dissolves the same quantity of a chain having a small molecular weight in a case where the polymer molecular chains have the same composition. Therefore, use of two types of macromonomers having different molecular weights as is employed in the present invention causes the two types of chains to attract each other. As a result, it can be considered that excellent results similar to those resulting from copolymerizing macromonomers having a large molecular weight with each other at an excellent rate of reaction can be realized.

Also the non-macromonomer is considered to have the foregoing mechanism where the non-macromonomer having a large molecular weight and branch portion of the graft copolymer having the same repetition unit structure and a small molecular weight attract each other so that the effect expected from a similar mechanism is exhibited.

BEST MODE FOR CARRYING OUT THE INVENTION

The present invention will now be described further in detail by way of the Examples.

EXAMPLE 1

As the silicone component having the radical polymerizable functional group, 25 parts by weight of a macromonomer (FM-0725 [in General Formula (I), R=—CH$_3$, R$_1$=—C$_3$H$_6$OCOC (CH$_3$)=CH$_2$, R$_2$=—CH$_3$, x=z=0, y=131] manufactured by Chisso Corporation), the structural unit repetition number n of which was 131, 5 parts by weight of a macromonomer (FM-0705 [in General Formula (I), y=7, R, R$_1$ and R$_2$ were the same as those of FM-0725] manufactured by Chisso Corporation), the structural unit repetition number n of which was 7, 10 parts by weight of methyl acrylate serving as the other vinyl monomer to be copolymerized with the macromonomer, 15 parts by weight of 2-ethylhexylacrylate, 41 parts by weight of styrene, and 2 parts by weight of 2-hydroxyethylmethacrylate and 2 parts by weight of methacrylic acid are mixed, and 0.2 parts by weight of azobis isobutylonitrile were, as the polymerization initiator, added thereto to be dissolved. Then, water was added to prepare a liquid with a monomer component concentration of 38 wt %. As the surface active agent, 0.6 wt % of the anion type agent having the polymerizable functional group and expressed by General Formula (III) (where X=SO$_3$NH$_4$, n=10, Adekalia Soap SE-10N manufactured by Asahi Denka Kogyo K.K.) was added to the foregoing mixed solution. Then, a high pressure homogenizer (MantonGolyn) was used to perform high speed emulsification so that an emulsion having an average particle size of 0.26 μm was obtained. The polymerization reactions were allowed to proceed by the emulsion dripping method under the following conditions.

| | |
|---|---|
| Nitrogen substitution | 30 minutes |
| Precharge | 5 wt % of the emulsion |
| Temperature at which reactions were allowed to proceed | 80° C. ± 2° C. |
| Time in which emulsion was dripped | 4 hours |
| Time of maturation | 2 hours |

The obtained water-based silicone type graft copolymer emulsion had the following characteristics:

| | |
|---|---|
| Concentration of solid component | 37.8 wt % |
| Particle size (Average value) | 0.18 μm |
| pH | 9.0 |
| MFT | 40° C. |
| Viscosity (30° C.) | 10 cps |
| Unreacted silicone macromonomer | 5 wt % or less (with respect to the total quantity of silicone) |
| Content of silicone component | 30 wt % (with respect to solid portion of the copolymer) |

EXAMPLES 2 TO 4

A similar method to that of Example 1 was employed except that the types and the quantities of the macromonomer, the non-macromonomer and the polyfunctional group macromonomer were employed as shown in Table 1 and the surface active agent shown in Table 1 was used in the same quantity as that used in Example 1. As a result, a water-based silicone type graft copolymer emulsion was manufactured.

TABLE 1

|  | Example 1 | Example 2 | Example 3 | Example 4 |
|---|---|---|---|---|
| Quantity of use of macromonomer having n larger than 20 (parts by weight) | 25 | 15 | 15 | 25 |
| Quantity of use of macromonomer having n smaller than 20 (parts by weight) | 5 | 10 | 5 | 5 |
| Quantity of use of non-macromonomer (parts by weight) | 0 | 5 | 0 | 0 |
| Quantity of use of polyfunctional macromonomer (parts by weight) | 0 | 0 | 10 | 0 |
| Content of silicone (wt %)* | 30 | 30 | 30 | 30 |
| Type of surface active agent (general formula) | (III) | (III) | (III) | (IX) |
| Particle size of emulsion (μm) | 0.26 | 0.25 | 0.26 | 0.22 |
| Unreacted silicone macromonomer (wt %) | <5 | <20 | <5 | <5 |
| Migration of silicone with adhesive tape | No migration | Small degree | No migration | No migration |
| Releasability with adhesive tape | Medium to slight | Slight | Medium to slight | Medium to slight |
| Quantity of grid (wt %)* | <1 | <1 | <1 | <1 |
| Film forming characteristics | Good | Good | Good | Good |
| Stability of emulsion | Good | Good | Good | Good |

*with respect to solid component of copolymer

TABLE 1-continued

|  | Example 1 | Example 2 | Example 3 | Example 4 |
|---|---|---|---|---|

(1) Macromonomer of type n > 20
Example 2 FM-0715 (n = 39, manufactured by Chisso Corporation)
Example 3 FM-0721 (n = 65, manufactured by Chisso Corporation)
Example 4 FM-0725 (n = 131, manufactured by Chisso Corporation)
(2) Macromonomer of type n < 20
Example 2 FM-0705 (n = 7, manufactured by Chisso Corporation)
Example 3 FM-0711 (n = 13, manufactured by Chisso Corporation)
Example 4 FM-0705 (n = 7, manufactured by Chisso Corporation)
(3) Non-macromonomer
Example 2 SH200-60000 (n = 780, manufactured by Toray Dow Corning Silicone)
(4) Polyfunctional group macromonomer
Example 3 FM-7711 (n = 13, manufactured by Chisso Corporation)
(5) Surface active agent
Example 2 Adekalia Soap NE-10 (X = H, n = 10, manufactured by Asahi Denka Kogyo K.K.)
Example 3 Adekalia Soap NE-20 (X = H, n = 20, manufactured by Asahi Denka Kogyo K.K.)
Example 4 Blenmer QA (manufactured by Nippon Oil and Fats Co., Ltd.)

Comparative Examples 1 to 7

Similar process to that according to Example 1 was performed except that the quantities of use of the macromonomers and the types (Comparative Example 1) of the emulsifiers according to Example 1 were changed to those shown in Table 2.

TABLE 2 (1/2)

|  | Comparative Example 1 | Comparative Example 2 | Comparative Example 3 | Comparative Example 4 |
|---|---|---|---|---|
| Quantity of use of macromonomer of a type n > 20 (parts by weight) | 25 | 29 | 5 | 5 |
| Quantity of use of macromonomer of a type n < 20 (parts by weight) | 5 | 1 | 5 | 25 |
| Quantity of use of non-macromonomer (parts by weight) | 0 | 0 | 0 | 0 |
| Quantity of use of polyfunctional macromonomer (parts by weight) | 0 | 0 | 20 | 0 |
| Content of silicone (wt %) | 30 | 30 | 30 | 30 |
| Type of surface active agent (general formula) | Note** | (III) | (III) | (III) |

TABLE 2 (1/2)-continued

|  | Comparative Example 1 | Comparative Example 2 | Comparative Example 3 | Comparative Example 4 |
|---|---|---|---|---|
| Particle size of emulsion (μm) | 0.26 | 0.24 | 0.22 | 0.24 |
| Unreacted silicone macromonomer (wt %) | <10 | <10 | <5 | <5 |
| Migration of silicone with adhesive tape | Medium | Great | No migration | No migration |
| Releasability with adhesive tape | Medium | Slight | Heavy | Heavy |
| Quantity of grid (wt %)* | >10 | <1 | >5 | <1 |
| Film forming characteristics | Good | Unsatisfactory | No good | Good |
| Stability of emulsion | No good | Unsatisfactory | Good | Good |

*with respect of solid component of the copolymer
**Emulsifier having no polymerizable characteristics: sodium dodecyl benzenesulfonate and polyoxyethylene nonylphenyl ether (weight ratio 1:1)

TABLE 2 (2/2)

|  | Comparative Example 5 | Comparative Example 6 | Comparative Example 7 |
|---|---|---|---|
| Quantity of use of macromonomer of a type n > 20 (parts by weight) | 5 | 40 | 0.45 |
| Quantity of use of macromonomer of a type n < 20 (parts by weight) | 5 | 25 | 0.45 |
| Quantity of use of non-macromonomer (parts by weight) | 20 | 0 | 0 |
| Quantity of use of polyfunctional macromonomer (parts by weight) | 0 | 0 | 0 |
| Content of silicone (wt %) | 30 | 65 | 0.9 |
| Type of surface active agent (general formula) | (III) | (III) | (III) |
| Particle size of emulsion (μm) | 0.27 | 0.21 | 0.28 |
| Unreacted silicone macromonomer (wt %) | >70 | >20 | <5 |
| Migration of silicone with adhesive tape | Great | Great | No migration |
| Releasability with adhesive tape | Slight | Slight | No separation |
| Quantity of grid (wt %) | <1 | <1 | <1 |
| Film forming characteristics | No good | No good | Good |
| Stability of emulsion | Good | No Good | Good |

*with respect to solid component of the copolymer
**Emulsifier having no polymerizable characteristics: sodium dodecyl benzenesulfonate and polyoxyethylene nonylphenyl ether (weight ratio 1:1)
(1) Macromonomer of type n > 20
Comparative Examples 1 to 7 FM-0725 (n = 131, the same product as that according to Example 1)
(2) Macromonomer of type n < 20
Comparative Examples 1 to 7 FM-0705 (n = 7, the same product as that according to Example 1)
(3) Non-macromonomer
Comparative Example 5 SH200-60000 (n = 780, the same product as that according to Example 2)
(4) Polyfunctional group macromonomer
Comparative Example 3 FM-7711 (n = 13, the same product as that according to Example 3)
(5) Surface active agent
Comparative Examples 2 to 7 Adekalia Soap SE-10N (the same product as that according to Example 1)

Comparative Example 8

Emulsification was performed without using the high pressure homogenizer (Manton Golyn) used in Example 1 but a usual mono-mixer was used to perform emulsification so that a monomer emulsion having an average particle size of 0.58 μm was obtained.

Then, the emulsion polymerization was performed by a method similar to that employed in Example 1. The obtained water-based silicone type copolymer emulsion had the following characteristics.

| Content of silicone (wt %)* | 30 |
|---|---|
| Unreacted silicone macromonomer (wt %) | >20 |
| Migration of silicone with adhesive tape | great |
| Releasability with adhesive tape | slight |
| Quantity of grid (wt %)* | >20 |
| Film forming ability | No good |
| Stability of emulsion | No good |

(*with respect to solid component of copolymer)

INDUSTRIAL APPLICABILITY

According to the present invention, a water-based graft copolymer emulsion having remarkable characteristics in comparison to polymer emulsions which is obtained by conventional emulsion polymerization or which cannot sufficiently exhibit the characteristics, expected from known silicone type macromonomers used can be obtained. The emulsion has a variety of characteristic functions depending upon the macromonomer or the non-macromonomer employed. Therefore, it is expected to be used as an adhesive agent or a coating agent in the broad sense including, in new processing fields for plastic, metal or glass to which conventional technology has not been satisfactory adapted, and may be exemplified by coating material such as adhesive agents, tackiness agents, separating agents, paint, binders for mortar or concrete, fiber processing agents and paper processing agents. Furthermore, the copolymer may be separated from the emulsion to be pulverized or used as a raw material of a molded substance as it is so as to be used in a modifier for a toner or in manufacturing acryl silicone rubber or the like. Thus, the water-based graft copolymer emulsion can be expected to used in a wide variety of fields as described above.

What is claimed is:

1. A method of manufacturing a water based silicone type graft copolymer emulsion consisting essentially of:

emulsifying and dispersing in water a mixture of a first and a second silicone macromonomer having a radical polymerizable functional group and another vinyl monomer such that the particle size of the emulsion is 0.5 μm or less, in the presence of an initiator and a surface active agent having a radical polymerizable functional group, and raising the temperature to copolymerize the emulsified and dispersed material, and wherein said first macromonomer comprising the silicone structural unit repetition number N of less than 20, and said second macromonomer comprising the silicone structural units repetition member of at least 20, and said first macromonomer being present in a quantity of 5 to 80 wt %, based on total weight of said macromonomers said macromonomer being expressed by a Formula I:

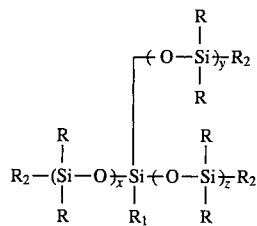

and wherein R is:

$-OH$, $-OC_mH_{2m+1}$, $-OPh$, $-C_mH_{2m+1}$, $-Ph$,

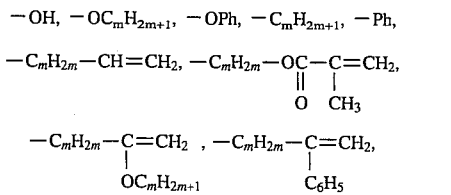

$-(CH_2CH_2-O)_n-CH=CH_2$, or $-CH_2-C_6H_4-CH=CH_2$, and wherein $R_1$ is

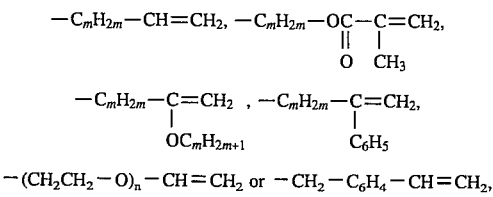

$-(CH_2CH_2-O)_n-CH=CH_2$ or $-CH_2-C_6H_4-CH=CH_2$, and wherein $R_2$ is:

$-C_mH_{2m+1}$, $-OH$, $-C_mH_{2m}-CH=CH_2$,

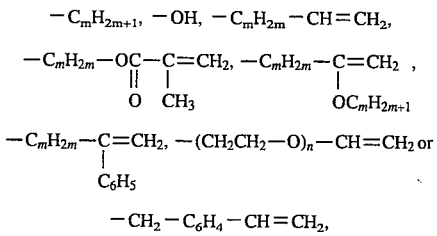

$-C_mH_{2m}-C=CH_2$, $-(CH_2CH_2-O)_n-CH=CH_2$ or
  |
  $C_6H_5$ $-CH_2-C_6H_4-CH=CH_2$, where Ph is phenyl group or alkyl substituted phenyl group; m is 0 to 10; n is 1 to 10 and with the proviso that: x+y+z=N, where x=0 to 150, y=0 to 150 and z=0 to 150.

2. A method of manufacturing a water based silicone type graft copolymer emulsion according to claim 1 wherein said copolymerization is performed in the presence of a silicone non-macromonomer expressed by a Formula II and having no radical polymerizable functional group:

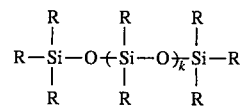

where R is $-C_mH_{2m+1}$, or $-Ph$, where m is 0 to 10; and wherein k is 100 to 10000.

3. A method of manufacturing a water based silicone type graft copolymer emulsion according to claim 1 wherein said surface active agent having a radical polymerizable functional group is selected from a group consisting of:

a) Formula III

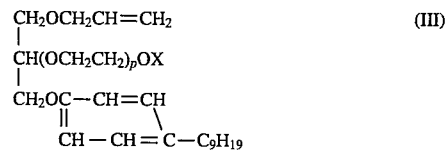

where X is hydrogen or $-SO_3NO_4$ and p is 5 to 50, b) Formula IV

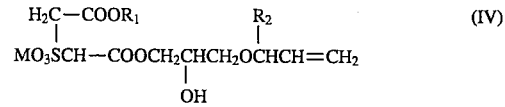

where $R_1$ is an alkylene group or a substituted alkylene group, $R_2$ is hydrogen or a methyl group and M is Na or $NH_4$, c) Formula V

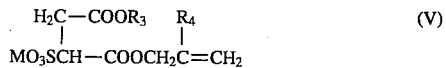

where $R_3$ is an alkylene group or a substituted alkylene group, $R_4$ is hydrogen or a methyl group and M is Na or $NH_4$, d) Formula VI

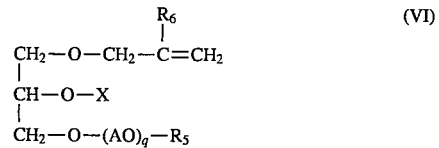

where $R_5$ is an alkylene group or a substituted alkylene group, $R_6$ is hydrogen or a methyl group, A is an alkylene group having 2 to 4 carbon atoms, X is hydrogen, a nonionic hydrophilic group or an anionic hydrophilic group and q is 0 to 100, e) Formula VII

where $R_7$ is an alkyl group, alkenyl group or an aralkyl group having 4 to 18 carbon atoms, $R_8$ is hydrogen, an alkyl group, an alkenyl group or an aralkyl group having 4 to 18 carbon atoms, A is an alkylene group or a substituted alkylene group having 2 to 4 carbon atoms, r is 2 to 200, M is an alkali metal atom, $NH_4$ or an alkanol amine residual group, f) Formula VIII:

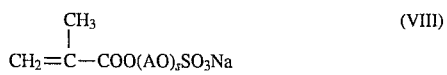

where A is an alkylene group having 2 to 4 carbon atoms and s is 0 to 100 and g) Formula IX:

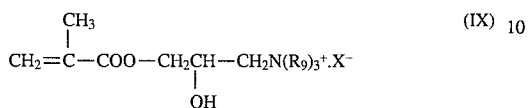

where $R_9$ is an alkyl group having 1 to 6 carbon atoms and X is a hydrochloride group.

4. A method of manufacturing a water based silicone type graft copolymer emulsion according to claim 2 wherein said non-macromonomer is present at 50 wt % or less of a silicone component, said silicone component consisting of said macromonomer and said non-macromonomer, and wherein said silicone component is 1 to 60 wt % of the total weight of said silicone component and said other vinyl monomer.

* * * * *